United States Patent [19]
Gecs

[11] Patent Number: 4,631,782
[45] Date of Patent: Dec. 30, 1986

[54] SELF-LOCKING FLAT CLAMPING BAND

[75] Inventor: Jan Gecs, Komarno, Czechoslovakia

[73] Assignee: Zavody Tazkeho Strojarstva, Narodny Podnik, Komarno, Czechoslovakia

[21] Appl. No.: 688,018

[22] Filed: Dec. 31, 1984

[30] Foreign Application Priority Data

Dec. 30, 1983 [CS] Czechoslovakia ............ 10200-83

[51] Int. Cl.⁴ ............................................. B65D 63/00
[52] U.S. Cl. ................................. 24/16 PB; 24/17 AP
[58] Field of Search ............ 24/16 PB, 17 AP, 17 A, 24/30.5 P; 248/74.3; 292/318, 321, 322

[56] References Cited

U.S. PATENT DOCUMENTS

| | | | |
|---|---|---|---|
| 2,979,794 | 4/1961 | Bartolo | 24/16 PB |
| 3,542,321 | 11/1970 | Kahabka | 24/16 PB |
| 3,855,669 | 12/1974 | Meyer | 24/16 PB |
| 3,886,630 | 6/1975 | Emery | 24/16 PB |
| 3,900,923 | 8/1975 | Thomas | 24/16 PB |
| 3,967,345 | 7/1976 | Sumimoto | 24/16 PB |
| 4,263,697 | 4/1981 | Speedie | 24/17 AP |
| 4,377,887 | 3/1983 | Valestin | 24/16 PB |
| 4,439,896 | 4/1984 | Matsui | 24/16 PB |

FOREIGN PATENT DOCUMENTS

| | | | |
|---|---|---|---|
| 2442414 | 3/1976 | Fed. Rep. of Germany | 248/74.3 |
| 2361563 | 3/1978 | France | 24/16 PB |
| 1291172 | 10/1972 | United Kingdom | 24/16 PB |
| 1567852 | 5/1980 | United Kingdom | 24/16 PB |

Primary Examiner—Victor N. Sakran

[57] ABSTRACT

One-piece self-locking flat clamping band for the fastening and binding of electrical conductors, cables or tubes of pneumatic distribution devices and of similar elements in mechanical engineering and agriculture, the band being able to repeatedly used. The band is provided with a toothing on its surface and with a head on one end with an opening for introduction of the other, tail end of the band. A catch is on provided said head, the catch having a corresponding toothing with a negative inclination of the front surfaces of teeth. The connection of the band can be opened by the tilting of the catch.

7 Claims, 15 Drawing Figures

SELF-LOCKING FLAT CLAMPING BAND

BACKGROUND OF THE INVENTION

The invention relates to a self-locking clamping band made from pliable synthetic material adapted for the fastening and binding of conductors or electrical distributing devices, of cables in runs thereof, tubes of pneumatic distribution devices, and the like.

Actually known means for fastening and binding of conductors in distribution devices, of cables in runs thereof, and the like, mostly use nylon wires and clamping bands with openings at regular intervals for a fixing bolt. The first method is rather wearisome; with the second method the rigidity of the binding is in some cases determined by the distance of openings. Clamping bands are also known which provide a lasting connection by means of a bolt in an internal part of a connecting head. Clamping bands are also known in which a lock is provided within a head comprising a steel tongue or a tooth of the same material as the band. There are also flat bands with a toothing, wherein in the internal part of a head at its upper surface a corresponding toothing is arranged, opposite to which a longitudinal opening is provided for the springing of the band in the course of its connection.

These bands have the drawback that the completed connection cannot be opened, or can be opened only with difficulty. The major part of these clamping bands have an opening in the head perpendicular to the band so that after accomplishing the connection, the whole head is beyond the circumference of the encompassed objects.

Clamping bands are also known in which the opening for the introduction of the band is parallel with the band, and the direction of introduction of the band is such that after accomplishment of the connection both the head and the free end of the clamping band are entirely beyond the circumference of the loop created in the band. These drawbacks frequently prevent the use of similar clamping bands in practice. The heads are of robust construction, particularly in clamping bands where within the head there are more teeth forming a lock for the achievement of a connection or of a binding.

A similar situation exists with bands where within the head a lock with a tiltable tooth has been provided. Similar bands have positively a substantially lower strength of the lock than the proper clamping band. The width of the tooth within the head can be made solely narrower than the width of the clamping band. In connection therewith, the active toothing on the proper clamping band is equal to the width of the tooth. This lock cannot be made to be self-locking, since the active too-thing on the band cannot be accomplished with a negative inclination of the front surfaces of teeth. Another drawback is that they cannot be manufactured in a smaller size for a realization of fine fastenings since the head is too robust so that the band cannot be applied or the tooth of the lock cannot perform its function due to its small dimensions.

With controls, repairs and additional adjustments in arrangements with electrical or pneumatic installations, one of the main requirements is that repairs can be accomplished quickly, reliably and simply. In the case of the application of the above mentioned clamping bands in arrangements with bundles of conductors, cables or tubes, there is a substantial drawback if they cannot be made accessible for repairs or adjustments. Each engagement into thus made fastenings or bindings has as a consequence that the clamping bands have to be removed and replaced by new ones; possibly there are also high time losses in case repairs and adjustments of the arrangement have to be made due to the use of clamping bands which are difficult to disassemble.

SUMMARY OF THE INVENTION

It is an object of this invention to provide a self-locking clamping band which can be repeatedly applied, could be easily connected and disconnected, is reliable in operation, and the lock of which, has a strength to that of the clamping band proper.

The clamping band according to this invention is provided on its upper surface across its entire width with an operating toothing with a negative inclination of front surfaces of teeth; the band terminates on one end in a wedge-shaped part serving to facilitate the introduction of the band into an opening in a head with an opening for the introduction of the band parallel with the band. The head of said clamping band is provided, according to this invention, with an extension in the shape of a tiltable catch provided on its lower surface with a corresponding toothing with a negative inclination or the front surfaces of teeth, oriented in the direction opposite to said operating toothing, Said catch is normally tilted towards the band, and on its free end is provided with a manipulating extension or recess. The catch can form an extension of the head in the direction of the band or in the opposite direction.

The clamping band is so connected that, after the introduction of the free wedge-shaped end of the band through the opening from the front side of the head, the mutually corresponding toothings on the band and on the catch secure a self-locking connection in case any part of the band is inserted into the head. In case the connection has be opened with a further possibility of its repeated application, the catch is tilted so that its toothing is disengaged from the operating toothing of the band, which band can thereafter be either shifted or completely pulled out of the head and thereafter repeatedly applied.

A substantial technical of the invention is the possiblity of an easy disassembling of a firm connection, or of a binding of connecting conductors, cables or tubes without inrterference into the internal parts of the head of the band. After the disconnection of the band, free access to all conductors, cables or tubes is achieved. The object of this invention enables repairs to be performed quickly, simply and reliably and the prior loosened clamping band to be repeatedly used. The clamping bands according to this invention are also superior to similar bands in that the strength of the lock is the same as the strength of the band in any cross section.

The corresponding toothings on the band and on the catch substantially uniformly distribute the stress in the lock, while utilizing the full width of the band; there are therefore no local deformations in case of higher stresses. As has been proved by tear tests, the self-locking property of the lock of the band even increases under increased tension. The construction of the lock of the clamping band permits the use of a fine toothing, due to which a repeated use of an accurate, solid and reliable connection or binding is secured. The free edge shaped part of the band facilitates the introduction of the band into the opening of the head. The inclined front side of the head has the same purposed. The main purpose of the use of an inclined front side of the head is, however, to secure a correct functioning of the catch which forms an extension of the head in case it is situated on the opposite side of the head from the band. The extension or recess on the free end of the catch facilitates, in case of need, the disconnection of the lock. The head and the free end of the clamping band follow after the connection or binding of conductors, cables or tubes has been accomplished, the circumference of the loop so that there are no projecting parts of the band. The extension on the free end of the catch is small and thin and acts on the lock solely in case the pull on this part is perpendicularly to the catch.

The clamping band according to this invention can be also made in a small scale for the connection of fine elements or thin conductors; this is of extraordinary importance for arrangement of current electrical engineering. the magnitude, thickness, the negative inclination of front sides of the teeth, and also the width and thickness of the band are chosen according to the material which is used. The length of the band is chosen with respect to the abvove mentioned parameters and requirements in practice. These clamping bands can be manufactured from strong, tough, flexible thermoplastic materials.

DESCRIPTION OF THE DRAWINGS

The attached drawings show eight exemplary embodiments of a clamping band according to this invention.

DESCRIPTION OF THE PREFERRED EMBODIMENTS

Figure 1:
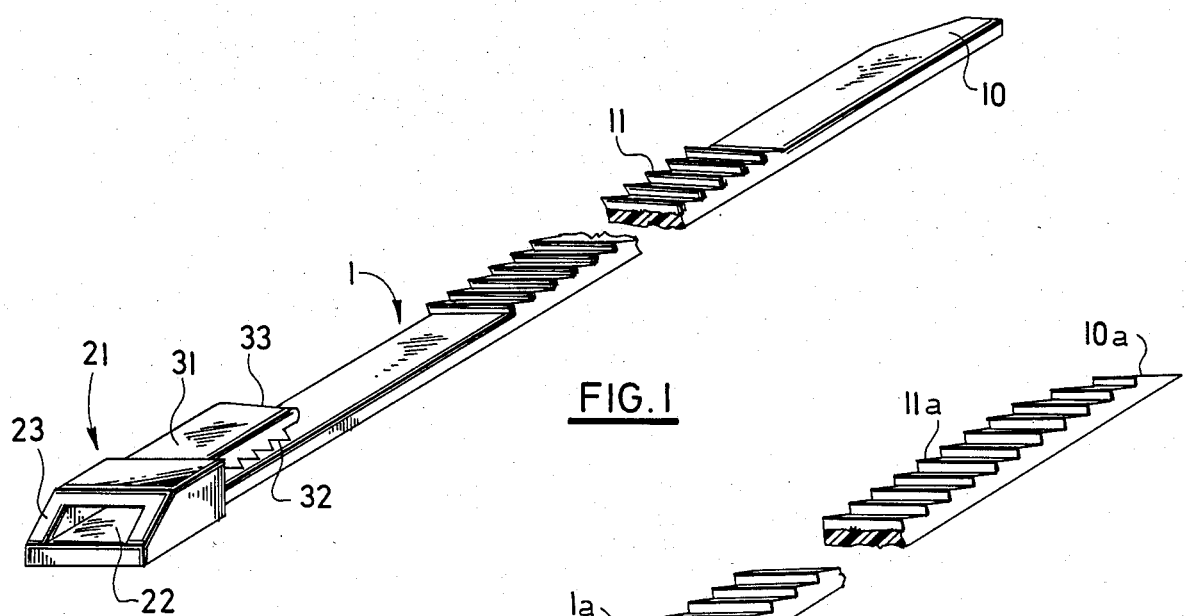
FIG. 1 is an axonometric view of a first embodiment of a clamping band with a catch situated in the direction of the main extent of the band, the band being provided with ratchet teeth in the longitudinal central part of the band.

FIG. 1 shows a self locking flat clamping band 1 terminating at its tail end in a wedge shaped part 10, with an operating toothing 11 at the upper surface of the band, the band terminating at its other, head end by a head 21 with an opening 22 and an inclined from said 23, with a tiltable catch 31 provided on the head, having a toothing 32 corresponding to the toothing 11 of the hand 1 and a manipulating extension 33.

Figure 1A:
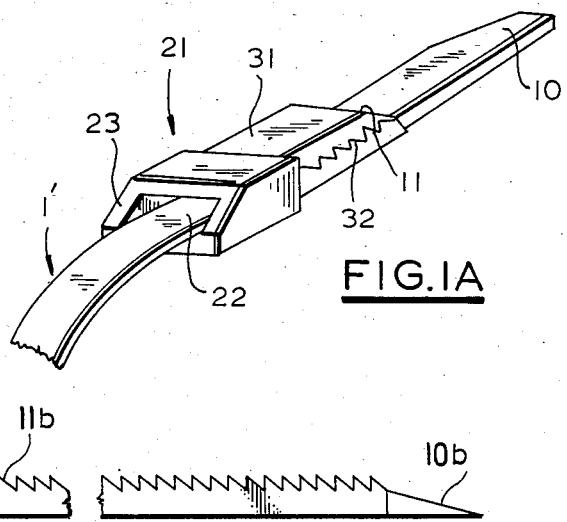
FIG. 1A is a fragmentary view in perspective showing the head and tail portions of the band of FIG. 1 joined together after the band has been bent into an arcuate shape.

In case the clamping band 1 is to serve as a connection or binding, the wedge shaped part 10 is introduced into the opening 22 of the head 21 and pulled as required, as shown in FIG. 1A, whereby the operating toothing 11 and the corresponding toothing 32 with negative inclination of front sides of teeth are in mutual engagement, as the catch urges the toothings into engagement, so that a self-locking connection is produced.

In case the firm connection or binding has to be disconnected, the catch 31 is tilted by pulling the manipulating extension 33 upward and the operating toothing 11 and the corresponding toothing 32 are disengaged and the clamping band 1 can be loosened or fully pulled out of the head 21.

Figure 2:
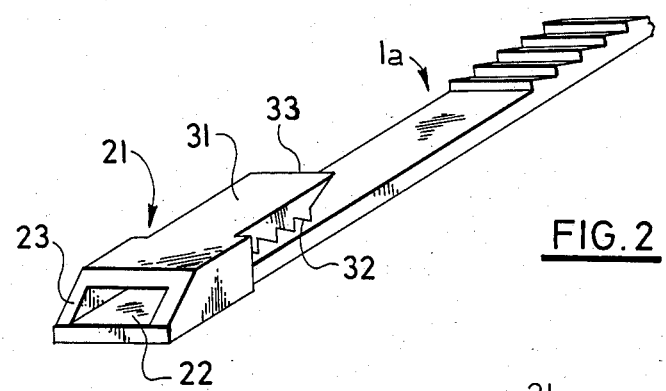
FIG. 2 is the same view of a second embodiment of clamping band provided with operating toothing along the whole length of the band.

FIG. 2 shows a second embodiment 1a of clamping band terminated at its tail end by short wedge-shaped part 10a, an operating toothing 11b along the whole length of the band, which band terminates on the other end in a head 21 with an opening 22 with an inclined front 23 and with a catch 31 provided with a corresponding toothing 32 and with a manipulating extension 33 with a downwardly facing wedge-shaped end.

Figure 3:
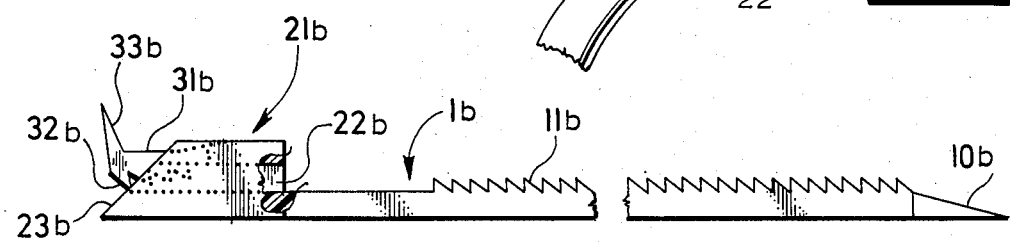
FIGS. 3, 5, 7, 9, 11, and 13 show in side elevation six further embodiments of clamping bands with different arrangements of the catch.
Figure 4:
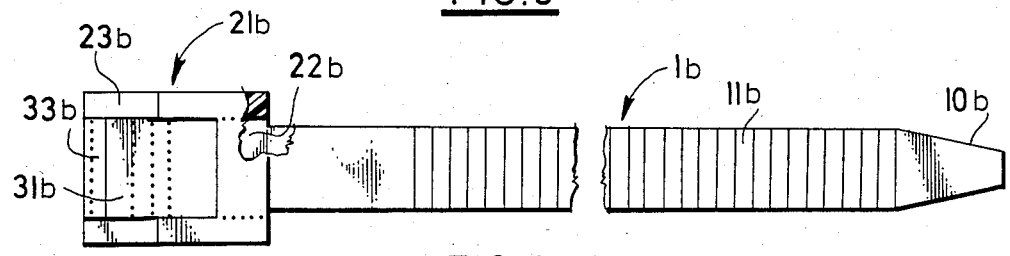
FIGS. 4, 6, 8, 10, and 14 are top views of the respective six further embodiments of clamping bands with different arrangements of the catch.

FIGS. 3 and 4 show a clamping band 1b terminating on one end in a wedge-shaped part 10b provided with an operating toothing 11, on the other hand by head 21b with an opening 22b and an inclined front side 23b and with a catch 31b on side of the head 21b opposite to the band 1b. Said catch 31b is provided with a corresponding toothing 32b and with an upwardly inclined manipulating extension 33b with wedge-shaped end.

Figure 5:
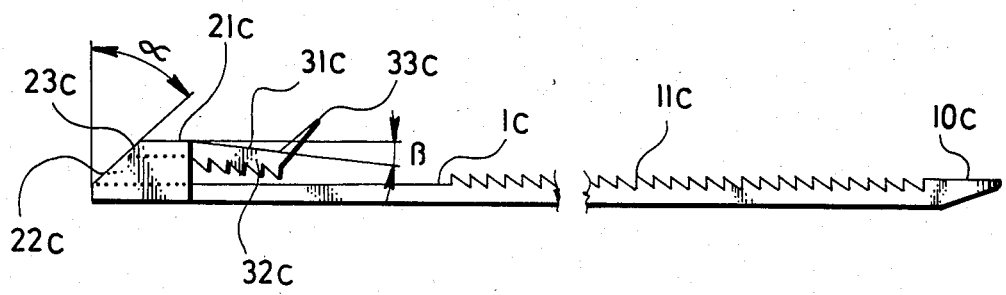
Figure 6:
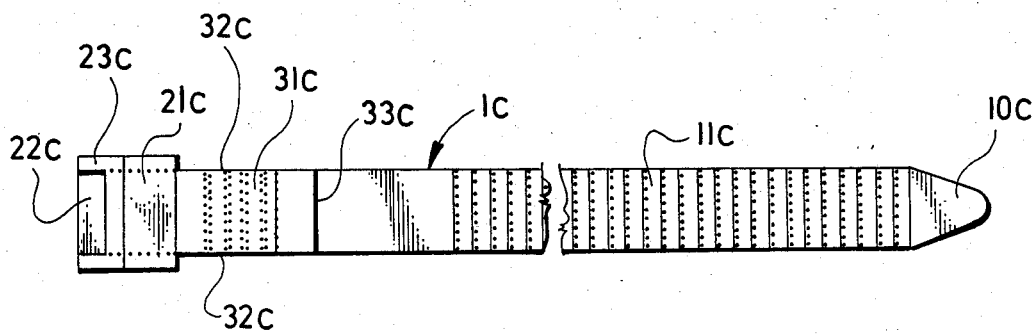

FIGS. 5 and 6 show a clamping band 1c terminating on one end in a wedge-shaped part 10c provided with an operating toothing 11c, on the other hand by head 21c with an opening 22c and an inclined front side 23c and with a catch 31e on one side of the head opposite to the band 1c. Catch 31c is provided with a corresponding toothing 32c and with an upwardly inclined manipulating extension 33c. The front side 23c of head 21c is inclined with respect to the length of band 1c at an angle, and the upper face of catch 31c is inclined with respect to length of band 1c at an angle $\beta$.

Figure 7:
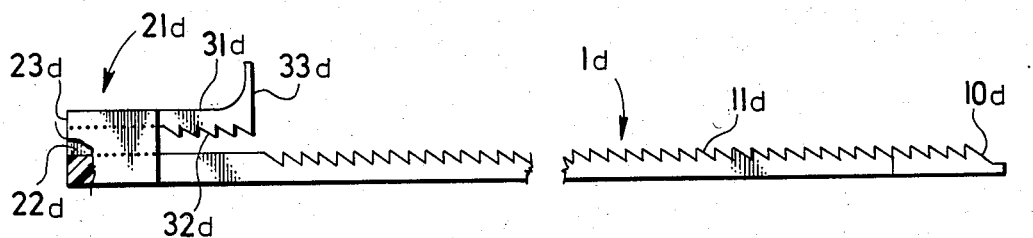
Figure 8:
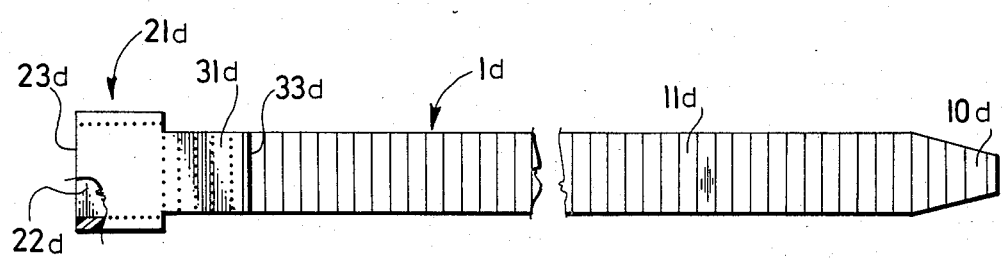

FIGS. 7 and 8 show a clamping band 1d terminating on end by a wedge-shaped part 10d and with an operating toothing 11d along the whole length of the band 1d. On the other end the band terminates in a head 21d with opening 22d therethrough and with a perpendicular front side 23d and with a catch 31d situated on said head 21d in the direction of the band 1d. The catch 21d is provided with corresponding toothing 32d and with a rectangular vertical manipulating extension 33d.

Figure 9:
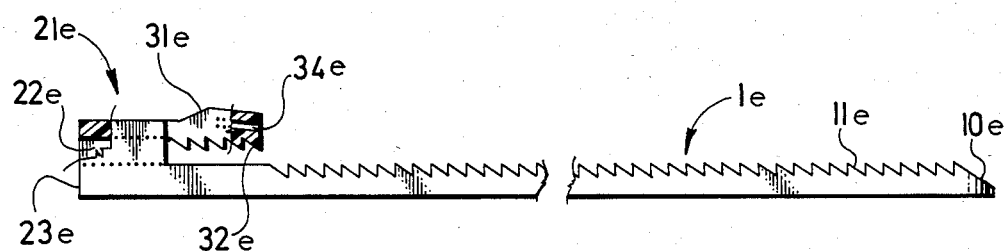
Figure 10:
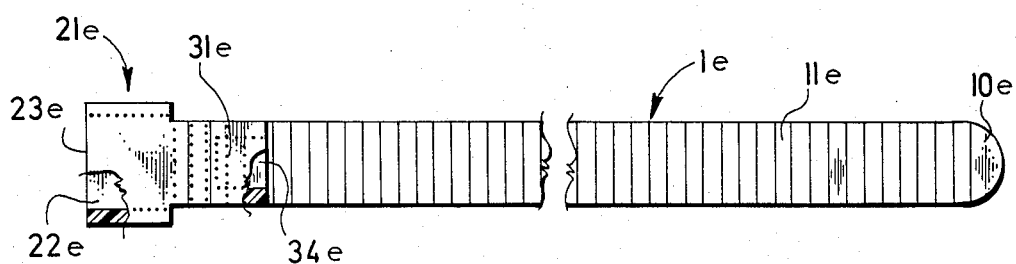

FIGS. 9 and 10 show a clamping band 1e, said band having a ramp-like end 10e on its tail or rear end and a head 21e on the other end. The head has a catch 31e thereon, said catch extending in the direction of the length of the band 1e. The outer free end of the catch 31e is provided with an opening or blind passage 34e therein to permit the insertion of a manipulating device such as the end of a key to raise the catch 31e from the main extent of the band 1e.

Figure 11:
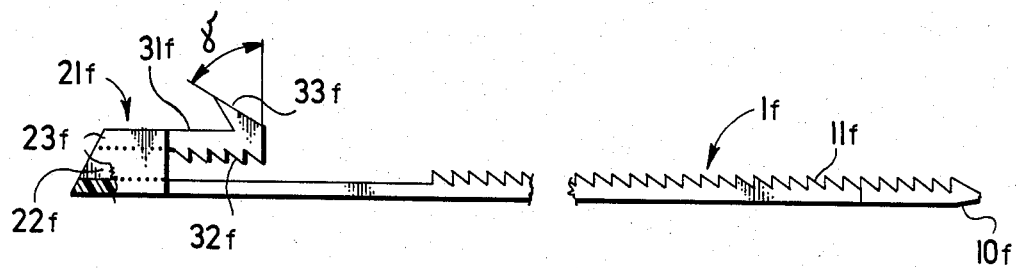
Figure 12:
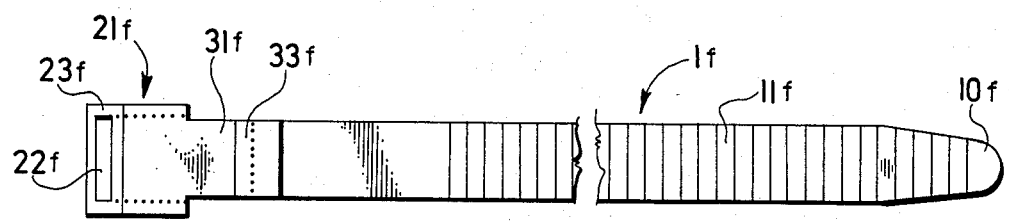
Figure 13:
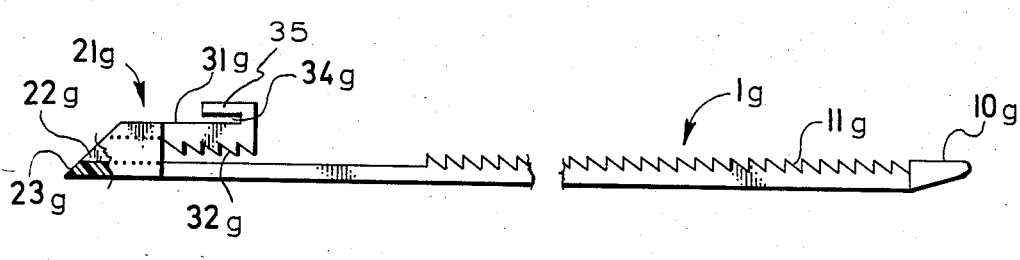
Figure 14:
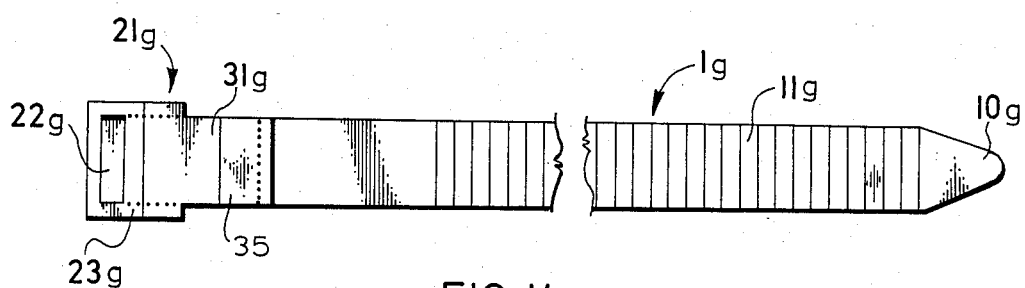

FIGS. 11 and 12, on the one hand, and FIGS. 13 and 14, on the other, show two further embodiments of the locking band of the invention. Parts in FIGS. 11 and 12 which are similar to those in FIG. 1 are designated by the same reference characters with an added f. Parts in FIGS. 13 and 14 which are similar to those in FIG. 1 are designated by the same reference characters with an added g.

In the embodiment of FIGS. 11 and 12 the manipulating extension 31 of has an upper surface 33f which inclines forwardly and upwardly at an angle with respect to the length of the band. In the embodiment of FIGS. 13 and 14 there is provided a forwardly facing tab 35 spaced above the upper surface of the catch 31g. Tab 35 can be readil graped between one's thumb and fingers, whereby the catch 31g can be easily pulled upwardly to disengage it from the teeth on the band proper.

The clamping band of the invention can be utilized in an electrical distribution systems, when installing cables, in pneumatic systems in mechanical engineering for holding different elements and parts, in the building industry, in agriculture for binding shelves of grain, for example, and for fastening various other objects in the like. The end portion 10 thereof may then be introduced into the opening 22 in the head. After the end 10 has been suitably advanced into the opening 22, the teeth 1 in the body 1 of the band engage the teeth 32 on the catch 31. The catch 31 may be forced upwardly by engaging the extension 33 as by one's thumb, whereby the end of the band 1 may be easily slid through the opening 22. Alternatively, the body 1 of the band may be both pushed and pulled past the catch 21 so as, in effect, to produce a ratcheting action between the teeth 11 and 32. It is to be noted that, as shown in FIG. 1, the left-hand flanks of the teeth 11 are vertical whereby the left-hand flanks thereof are inclined downwardly and to the right. The right-hand flanks of teeth 32, on the other hand, extend vertically, whereas the left-hand flanks thereof are inclined upwardly and to the left. This makes the above described ratcheting action between teeth 11 and 32 possible, and also produces a positive locking between teeth 11 and 32 when such teeth are meshed and the tiltable catch 31 is in its lower, locking position as shown in FIG. 1A. In case the firm connection or binding has to be disconnected, the catch 31 is tilted and the teeth 11 and the corresponding teeth 32 are disengaged so that the clamping band 1 can be fully loosened or fully pulled out of the head 21.

Although the invention is described and illustrated with reference to a plurality of embodiments thereof, it is to be expressly understood that it is in no way limited to the disclosure of such preferred embodiments but is capable of numerous modifications within the scope of the appended claims.

I claim:

1. One-piece self-locking flat clamping band provided on its upper surface within its whole width with an operating toothing with a negative inclination of front sides of teeth, the band terminating on one end by a tail part and on the other end by a head with an opening for the introduction of the tail part of said band, the head being parallel with the band, a catch being provided on said head beyond the internal part of the head, a toothing with negative inclination of the front sides of teeth corresponding to the toothing on the band oriented in the opposite direction to that of said operating toothing being provided on the lower surface of said catch, both said toothings when mated forming a lock, said catch and that of the corresponding toothing situated thereon each having at least three teeth and having the same width as the band, the catch with its mating toothing being tilted toward the band so that after the lock has been formed the catch exerts a substantial pressure on the operating toothings.

2. Self-locking flat clamping band as in claim 1, wherein the head is provided with a front side inclined with respect to the surface of the band at an angle $\phi$ of 0° to 60°.

3. One-piece self-locking flat clamping band as in claim 1, wherein the band is made of strong resilient plastic material.

4. Self-locking flat clamping band as in claim 1, wherein said catch forms an extension of the head in the direction of the band.

5. Self-locking flat clamping band as in claim 1, wherein the catch is provided on its free end with a manipulating extension in order to facilitate the opening of the lock, said extension being at an angle $\phi$ of 0° to 90° with respect to the catch.

6. Self-locking flat clamping band as in claim 1, wherein the catch is provided with a manipulating recess in order to facilitate the opening of the lock.

7. Self-locking flat clamping band as in claim 1, wherein the catch forms an extension of the head in a direction opposite to the band.

* * * * *